United States Patent
Burke et al.

(10) Patent No.: US 8,381,205 B2
(45) Date of Patent: Feb. 19, 2013

(54) CO-RESIDENT SOFTWARE PERFORMANCE TRACKING

(75) Inventors: Michael R. Burke, Rochester, MN (US); Nicholas F. Campion, Rochester, MN (US); Joseph H. Peterson, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 12/132,038

(22) Filed: Jun. 3, 2008

(65) Prior Publication Data

US 2009/0299698 A1 Dec. 3, 2009

(51) Int. Cl.
*G06F 9/44* (2006.01)

(52) U.S. Cl. .......... 717/168; 707/201

(58) Field of Classification Search .......... 717/115, 717/117, 169, 168, 170, 172; 707/201
See application file for complete search history.

(56) References Cited

U.S. PATENT DOCUMENTS

| | | | | |
|---|---|---|---|---|
| 3,626,427 | A * | 12/1971 | MacSorley et al. | 712/244 |
| 3,963,872 | A * | 6/1976 | Hagstrom et al. | 379/245 |
| 5,166,556 | A * | 11/1992 | Hsu et al. | 326/41 |
| 5,251,295 | A * | 10/1993 | Ikenoue et al. | 345/504 |
| 5,338,891 | A * | 8/1994 | Masubuchi et al. | 84/600 |
| 6,175,869 | B1 | 1/2001 | Ahuja et al. | |
| 6,453,468 | B1 | 9/2002 | D'Souza | |
| 6,529,784 | B1 * | 3/2003 | Cantos et al. | 700/79 |
| 6,922,831 | B1 | 7/2005 | Kroening et al. | |
| 7,055,149 | B2 * | 5/2006 | Birkholz et al. | 717/172 |
| 7,086,050 | B2 | 8/2006 | Barton et al. | |
| 7,350,205 | B2 * | 3/2008 | Ji | 717/172 |
| 7,421,688 | B1 * | 9/2008 | Righi et al. | 717/172 |
| 7,458,073 | B1 * | 11/2008 | Darling et al. | 717/168 |
| 7,478,433 | B2 | 1/2009 | Hashiguchi | |
| 7,568,018 | B1 * | 7/2009 | Hove et al. | 709/221 |
| 7,673,301 | B1 * | 3/2010 | Righi et al. | 717/172 |
| 7,703,090 | B2 | 4/2010 | Napier et al. | |
| 7,779,404 | B2 * | 8/2010 | Movassaghi et al. | 717/171 |
| 7,840,960 | B2 | 11/2010 | Miura et al. | |
| 7,966,278 | B1 * | 6/2011 | Satish | 706/52 |
| 2006/0277102 | A1 * | 12/2006 | Agliozzo | 705/14 |

* cited by examiner

*Primary Examiner* — Don Wong
*Assistant Examiner* — Mohammad Kabir
(74) *Attorney, Agent, or Firm* — Cantor Colburn LLP

(57) ABSTRACT

A method for determining the operating status of a proposed application configuration on a first client including receiving updates from a plurality of clients, each update including a client identification, a previous state indication, a current state indication, and an indication of the operating status of the current state. The method also includes storing the updates in a database, the updates being stored such that the performance of a current state may be identified at two different times; receiving a proposed state change from the first client, the proposed state change including a current state of the first client and a proposed application to be added to the first client; querying the database to identify instances of the proposed state change; determining risks associated with adding the proposed application based on the results of querying the database; and transmitting to the first client a description of the risks associated with adding the proposed application.

18 Claims, 5 Drawing Sheets

CO-RESIDENT SOFTWARE PERFORMANCE TRACKING

CROSS REFERENCE TO RELATED APPLICATIONS

The present application is co-pending with the concurrently filed application U.S. patent application Ser. No. 12/132,358 entitled "DETERMINING APPLICATION DISTRIBUTION BASED ON APPLICATION STATE TRACKING INFORMATION", filed contemporaneously herewith and hereby incorporated by reference in its entirety, assigned to the assignee of the present application.

BACKGROUND OF THE INVENTION

This invention relates generally to computers and, more particularly, to tracking the effects of different combinations of application programs on a computer.

When attempting to vertically scale a system, understanding the interactions of co-resident applications is vital to understanding their system resource requirements. The traditional methods of determining the ability of applications to co-reside require an integrator providing a computing device such as a mainframe computer, personal computer, handheld computer, and the like, to test all possible combinations of software (also referred to herein as "applications") that may be deployed on the computing device to determine if all combinations allow the computing device to function appropriately. Testing in this manner may be acceptable when there are only a few applications but, as independent software vendor (ISV) and partner applications are added, the domain of end user application combinations grows exponentially. It becomes impractical to test all of the combinations and, even if it was practical to test all combinations of existing applications, it will still remain impractical to constantly test all possible new applications that could be installed on the computing device.

Another method of determining whether co-resident applications will be able to run on a particular computing device is to rely on the system requirements of third parties (ISVs and partners) and use those to estimate workloads on the computing device. This method, however, does not a priori reveal whether two applications designed by different ISVs may have adverse effects on each other. It would be impractical to expect ISV's to test their software with our other ISV's (possibly competitors) for the same reasons as it would be for a system integrator as described above.

Further, relying only on a stand-alone profile of each application, and combining applications based on their profile requirements may fail to reveal negative interaction consequences as well as overstate system requirements. For instance, application A may require 2 GB of memory and application B may require 1 GB of memory, but together they may both be able to operate with 2.5 GB of memory. Combining the requirements would also put integrators at the mercy of the ISVs supplying the applications because an integrator may only be as accurate as the ISV's determination of the application's requirements.

There exists a need, therefore, for the ability to measure application co-residency capability without having to test each combination of applications.

BRIEF SUMMARY OF THE INVENTION

An exemplary embodiment includes a system for tracking performance of various configurations of co-resident applications on a plurality of. The system of this embodiment includes a plurality of client systems, each client system including a client module configured to determine performance characteristics of a current state of the client, wherein the current state includes an indication of applications installed on the client. The system of this embodiment may also include a server coupled to the plurality of clients, the server including a server module configured to determine a risk associated with a proposed state change of a one of the plurality of client systems and a database coupled to the server and the plurality of client systems configured to receive status updates relating to current operating conditions of the plurality of client systems and to receive state change information in the event one or more of the client systems changes from one state to another state.

Another embodiment of the present invention is directed to a method for determining the operating status of a proposed application configuration on a first client. The method of this embodiment includes receiving updates from a plurality of clients, each update including a client identification, a previous state indication, a current state indication, and an indication of the operating status of the current state; storing the updates in a database, the updates being stored such that the performance of a current state may be identified at two different times; receiving a proposed state change from the first client, the proposed state change including a current state of the first client and a proposed application to be added to the first client; querying the database to identify instances of the proposed state change; determining risks associated with adding the proposed application based on the results of querying the database; and transmitting to the first client a description of the risks associated with adding the proposed application.

Another embodiment of the present invention is directed to a method of creating a database of possible states of a plurality of clients, each state including a unique combination of applications. The method of this embodiment includes receiving periodic updates from the plurality of clients, each update including a performance indication and an applications list; receiving a status change update each time one of the plurality of clients adds an application, the status change update include an updated applications list containing an indication of all applications on the one of the plurality of clients; comparing the status change update with one or more of the previous periodic updates; and creating a new state in the database whenever updated applications list does not match any previously received applications list.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
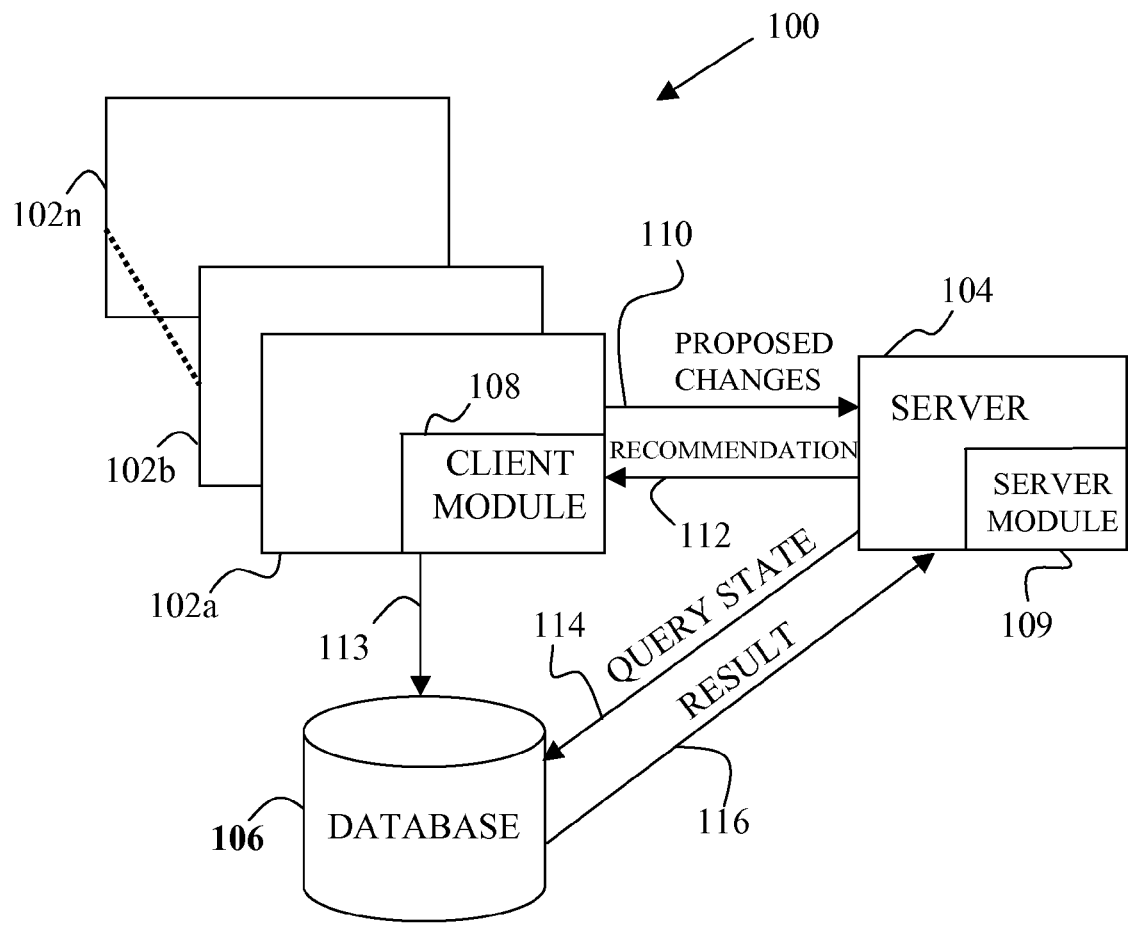
FIG. 1 depicts an example of a system according to an embodiment of the present invention.

An exemplary embodiment of the present invention provides the ability to determine whether a particular application may be safely added to client computing device. Advantageously, information about which co-resident applications may safely run on a computing system may be determined without requiring that a system integrator test every possible combination of applications.

In more detail, an embodiment of the present invention tracks client deployments of applications and uses aggregated information about the deployments to determine how co-resident applications affect each other's performance. Instead of the traditional profiling focused on each application standing alone, embodiments of the present invention focus on what happens when adding the application to an environment running some group of existing applications. This performance and resource usage may be tracked on client deployments and used to dynamically adjust an application's system requirements in an e-market place. In short, rather than testing all possible application combinations, clients are allowed to install any configuration unless another client has installed the configuration and it has been determined to be a non-functional configuration. In this manner, a collection of client, rather than the integrator, will perform the configuration tests.

In one embodiment, the present invention includes two modules, one that is resident in either hardware or software at a client's computing system (referred to as the "client" or "client system") and one that is resident in either hardware or software at a server (referred to as the "server"). The client module tracks system performance in intervals called "states." Each state is associated with a set of applications installed on the client. The state measures a duration of time over which the set of applications on the system did not change. A state could also contain the systems hardware configuration (in certain circumstances) and what the previous state was. Any time a new piece of software is added to the machine, the client module creates a new state and that state's time starts. In terms of analysis, the performance of a state will describe the observed average performance of a set of applications that are co-resident on a single client machine for some duration. Periodically, and at the end of each state's duration, the current state's performance information will be uploaded to a database. An upload can also be triggered remotely by service on demand.

The server module has two main roles: managing the distribution of software and correlating the performance information gathered from multiple clients. The server on which the server module is resident, hosts a location where users of the client may go to download new applications for their systems. The server aggregates the state information from the clients to determine if there are any states where the application will not function. When a particular client, or user of that client, attempts to purchase and/or install a new application, the client's current state is compared with the aggregated state information stored on the server to determine if their proposed new application state will function. In this way, safe guards against unsafe application deployments may be enhanced.

FIG. 1 shows an example of a system 100 according to one embodiment of the present invention. The system includes a plurality of clients 102a, 102b . . . 102n, a server 104 and a database 106. As shown, the database 106 is a separate unit. In some embodiments, the database 106 may be part of the server 104. As shown, the clients 102, the server 104 and the database 106 are connected to one other via various communication lines (e.g., communication lines 110, 112, 113, 114, and 116). In some embodiments, the communication lines may be part of a communications network such as the Internet.

The client 102 may be implemented using a general-purpose computer executing a computer program for carrying out various processes. The client 102 may be a personal computer (e.g., a lap top, a personal digital assistant) or a host-attached terminal. If the client system 102 is a personal computer, the processing described herein may be shared by the client system 102 and the server 104 (e.g., by providing an applet to the client system 102). Alternatively, the client 102 may be a remote system operating over a wireless network.

The server 104 executes computer instructions for determining the risks associated with allowing a client to move from one state to another. In an exemplary embodiment, the server 104 includes a server module that accesses the database 106 and determines the risks associated with a particular state change request received from a client 102.

The communication links 110, 112, 113, 114, and 116 may be part of any type of known networks including, but not limited to, a wide area network (WAN), a local area network (LAN), a global network (e.g. Internet), a virtual private network (VPN), and an intranet. The networks may be implemented using a wireless network or any kind of physical network implementation known in the art. A client 102 may be coupled to the server 104 and the database 106 through multiple networks (e.g., intranet and Internet) so that not all client systems 102 are coupled to the server 104 through the same network. In one embodiment, clients 102 may be connected directly to the server 104 (i.e., not through a network) and the server 104 may be connected directly to or contain the database 106.

The database 106 includes data repositories with databases relating to state information and may be implemented using a variety of devices for storing electronic information. It is understood that the database 106 may be implemented using memory contained in one or more servers (e.g., server 104) or that it may be comprised of separate physical devices. Information stored in the database 106 may be retrieved and manipulated via the server 104 and/or via the client 102. The database 106 may include one or more databases containing state information. The state information in the databases may be text or binary coming from a variety of sources, such as, but not limited to, applications running on clients 102.

As discussed above, one or more of the clients 102 may include a client module 108. The client module 108 tracks system performance in intervals called "states." Each state is associated with a set of applications installed on the client. The state measures a duration of time over which the set of applications on the client 102 did not change. A state could also contain the systems hardware configuration (in certain circumstances) and what the previous state was. Any time a new piece of software (application) is added to the machine, the client module 108 creates a new state and that state's time starts. In terms of analysis, the performance of a state will describe the observed average performance of a set of applications that are co-resident on a single client machine for some duration. Periodically, and at the end of each state's duration, the current state's performance information will be uploaded to a database. An upload can also be triggered remotely by service on demand.

The server 104 may include a server module 109. The server module 109 may have two main roles: managing the distribution of software and correlating the performance information gathered from multiple clients. The server 104 on which the server module 109 is resident, may host a location (such as a web-site) where users of the client 102 may go to download new applications. When the client, or user of that client, 102 attempts to purchase and/or install a new application, the client's current state is compared, by the server 104, with the aggregated state information stored in the database 106 to determine if the proposed new application state will function. In this way, safe guards against unsafe application deployments may be enhanced. In one embodiment, the server 104 may limit the ability of a client 102 to move to a state that has previously been determined to be unsafe, the server 104 may simply deny to software installation. In other embodiments, the server 104 may allow the installation but may warn a user of the client 102 that installing the software may adversely effect the operation of the client 102. For instance, the server may inform the client 102 that a particular installation may move the client 102 into a "marginal" or "degraded" state. Other states that may be utilized in embodiments of the present invention may include "healthy" and "non-functional." A non-functional state may not be allowed and a healthy state may be allowed without any user of a particular client 102 input. Marginal and degraded states may require that the user of client 102 make a decision as to whether to install the particular application after receiving a notification that the proposed state may be place the client 102 in either of these states.

It may be noted that the present invention may be especially useful when hardware capabilities are constant across clients 102. For instance, if all clients 102 have the same hardware capabilities but could potentially have different applications installed. Thus, rather than having to give specific hardware resource requirements for each piece of software, the server 106 may simply examine all the combinations of applications and determine which sets are capable of running simultaneously on the same client. As different hardware versions become available, different domains of application states will need to be tracked. This is significant because application state A on client version A would not necessarily run the same as state A on version B (with different hardware).

The implementation of "state tracking" by the server module 109 may involve querying a table database 106 that contains all the known application states (a software state that has been used) for a single model of a client. To determine these states, all pieces of software packages being installed on the system would need to have a unique ID assigned (Product Package ID). Whenever a new application state is created by a client 102 using a set of applications that has not been previously used, a new entry is added to the table. As applications are installed, the performance information for the client's previous state is uploaded to the server 104 and is entered into the table in the database 106. That information can now be referenced by other clients as they make a decision on whether to purchase an application.

FIG. 1 will now be described as a dataflow diagram. That is, the following description follows data transfer between the client 102, the server 104 and the database 106 in normal operation. The following description references communication links 110, 112, 113, 114 and 116. The references to these links describes the data flow and could, of course, be implemented as any type of communication connection so long as the described data is capable of being sent from the first location to the second location.

Periodically, the client module 108 may send a status update along communication path 113 to the database 106. The status update may include, for example, an identifier for the client 102 on which the module is resident, the applications running on the client 102, the hardware configuration of the client 102 and an operational status identifier indicating how well the client 102 is performing. The information from the status update may be stored in the database 106. In addition, each time a client 102 adds a new application or removes an application, the client 102 transmits a change of state message to the database. The change of state message may be the same as a typical status update only that the application list is changed. As discussed above, when an application list containing a combination of applications not previously recorded is presented, a new state is created.

The addition of an application to a client 102 may occur in a number of ways. According to an embodiment of the present invention, a client or user of client 102 may choose one or more applications to install from a group of applications. The group of applications may be represented on the server 104. In one embodiment, the server 104 may contain a listing of available applications and have links to another location where the application is stored for download. In another embodiment, download copies of the applications may be stored on the server 104.

Regardless, the client 102 submits a proposed change message to the server 104 via communication link 110. The proposed change message may, in some embodiments, only include a client ID and an application requested or it may contain a current state and a proposed new state. Regardless, the server module 109 contained in the server 106 queries the database 106 as indicated by communication link 114. The results of the query may be transmitted back to the server module 109 as indicated by communication link 116. Based on the results, the server module 109 may block the download of particular application, may alert a user of the client 102 that downloading the software may adversely affect the client 102, or may either indicate that the download is acceptable or just allow the download to happen.

Figure 2:
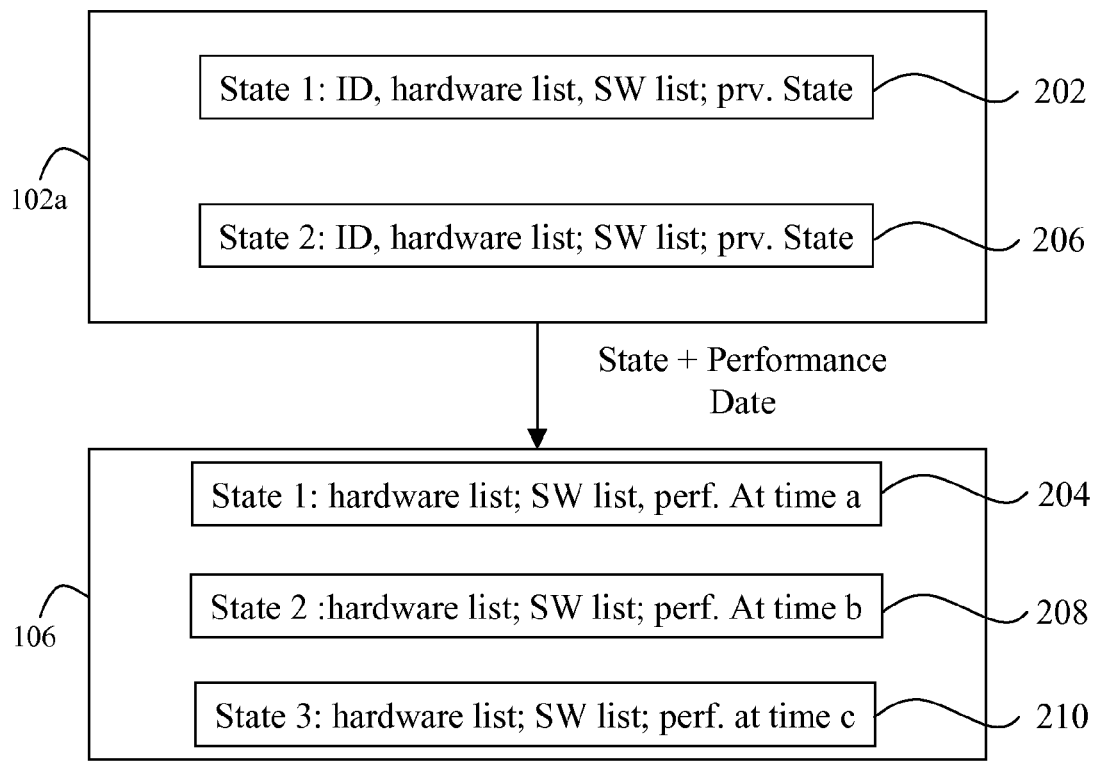
FIG. 2 depicts a more detailed example of a portion of the system depicted in FIG. 1.

FIG. 2 shows various states over time in a first client 102a and an example of how those states are represented by in the database 106. At a first time (a), the client 102 may be in a first client state 202. This state may be characterized by one or more of the following attributes: a client identification (ID), a hardware list, an application or software list, a previous state and a performance indicator. The hardware list may identify some or all of the hardware comprising the client 102a, or it may simply contain a hardware version identifier. As discussed above, in some systems the hardware configuration may be the same for all clients 102. In such a case, the hardware list may not be needed. The application list may contain a listing of all software programs resident on the client. This list may include not only the software programs but also may include all of the add-ons or other software programs dedicated to assisting the operation of other programs. The previous state may be an indication of the state the machine was in before the current state. In this example, the previous state of first client state 202 may be state 0. The performance indicator may, for example, a representation of the number of errors occurring in the system, system speed, and the like.

In the database 106, the first client state 202 may be represented by the first state 204. This first state 204 may include a hardware list, a software list and a performance indicator at a particular time. In this example, the particular time is a first time (a). The "time a" designation may represent a time at which a client changed states or when a client sent a status update.

At a second time (b), the client 102a may be in a second state 206. This second state may by characterized by the same fields as the first state 202 but have a different application state and the previous state for the second state 206 is the first state 202. In some embodiments, the previous state may be represented by an indication of applications added (or deleted) that caused the client 102a to change states.

The database 106 may include two more records, 208 and 210 for the second state. The first record of the second state 208 may indicate a time b when that particular was entered and a second record of the second state 210 recorded at a later time, time c. Having multiple records of the same state may allow for performance tracking.

It will be understood that many clients 102 may be coupled to the database 106. Each time a new application list is received from any of these clients, a new state may be created and the continued viability of operation in that state tracked.

Figure 3:
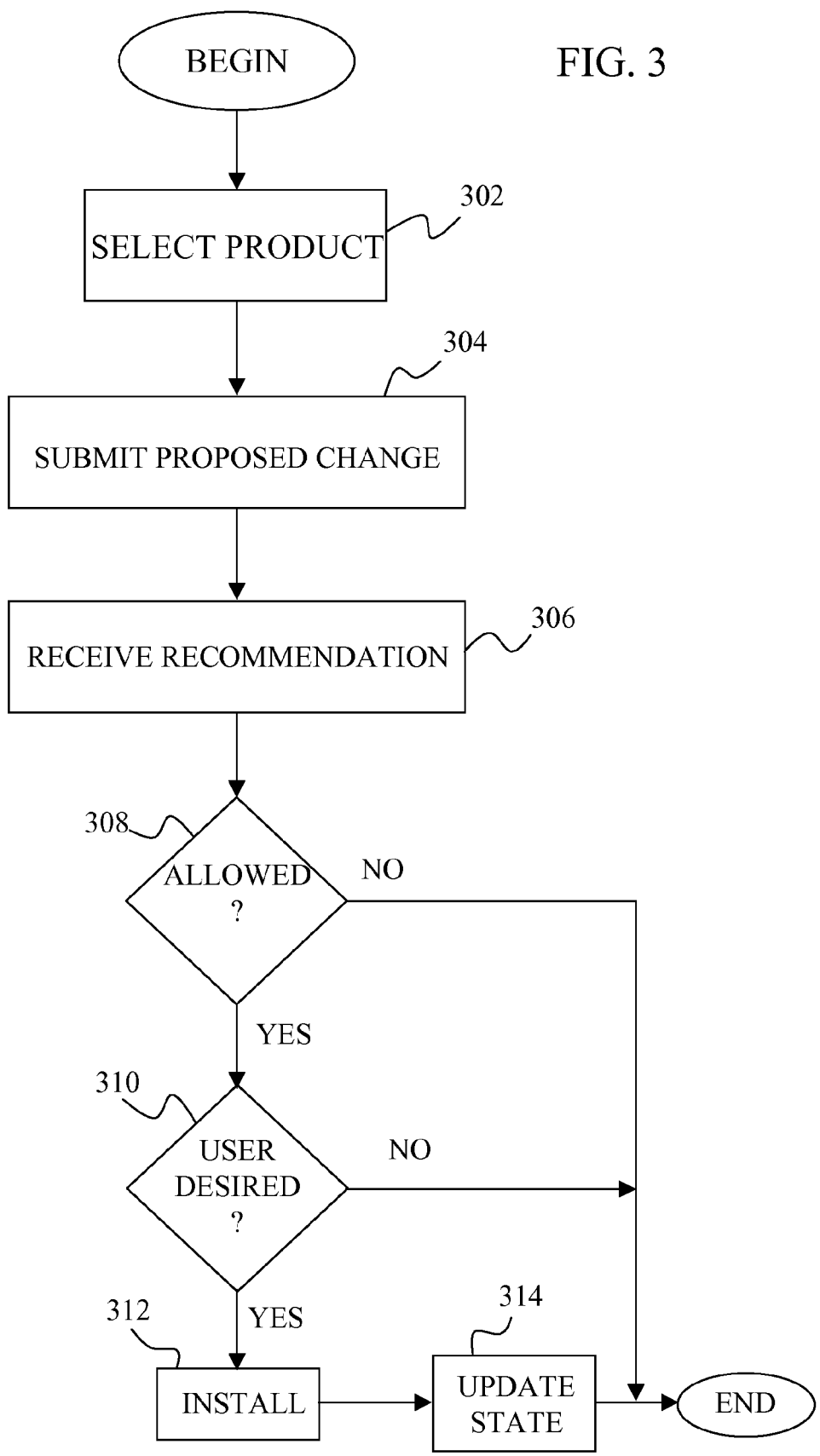
FIG. 3 shows a block diagram of a process by which a database of acceptable combinations of application software may be created and installation of new applications may be monitored according to an embodiment of the present invention.

FIG. 3 shows an example of a process according to one embodiment of the present invention. At a block 302, a product may be selected for addition to a particular client. The selection of a product may entail a user causing the client to go to a particular website maintained by a server. In some embodiments, this server may be the server 104 described with respect to FIG. 1. However in some embodiments the product or application may be available from other locations. Regardless, at a block 304 a proposed state change is submitted to a central server. The proposed state change may include an indication of the current state of the machine. In some embodiments this current state may be represented by the application list described above. The proposed change will also include an indication of the application that the client wishes to add.

At a step 306 the client or user of client may receive a recommendation as to the risk associated with adding the desired application. How such a recommendation is created will be discussed in greater detail below. At a block 308 it is determined whether the proposed change is allowed. If it is not, the application is not downloaded nor installed. If the program is allowed, processing proceeds to a block 310 where a user is prompted to determine whether or not they want to download and install the application. As discussed above a recommendation may include notification that, while the application may be installed, the installation of the program may degrade performance of the client. Hence, the choice provided in block 310 allows the user to determine whether the possible consequences outweigh the rewards of installing the application. If the user so desires, processing proceeds to a block 312 where the program is downloaded and installed. After the program has been downloaded and installed at a block 314 the state of the client is updated as describe above.

Figure 4:
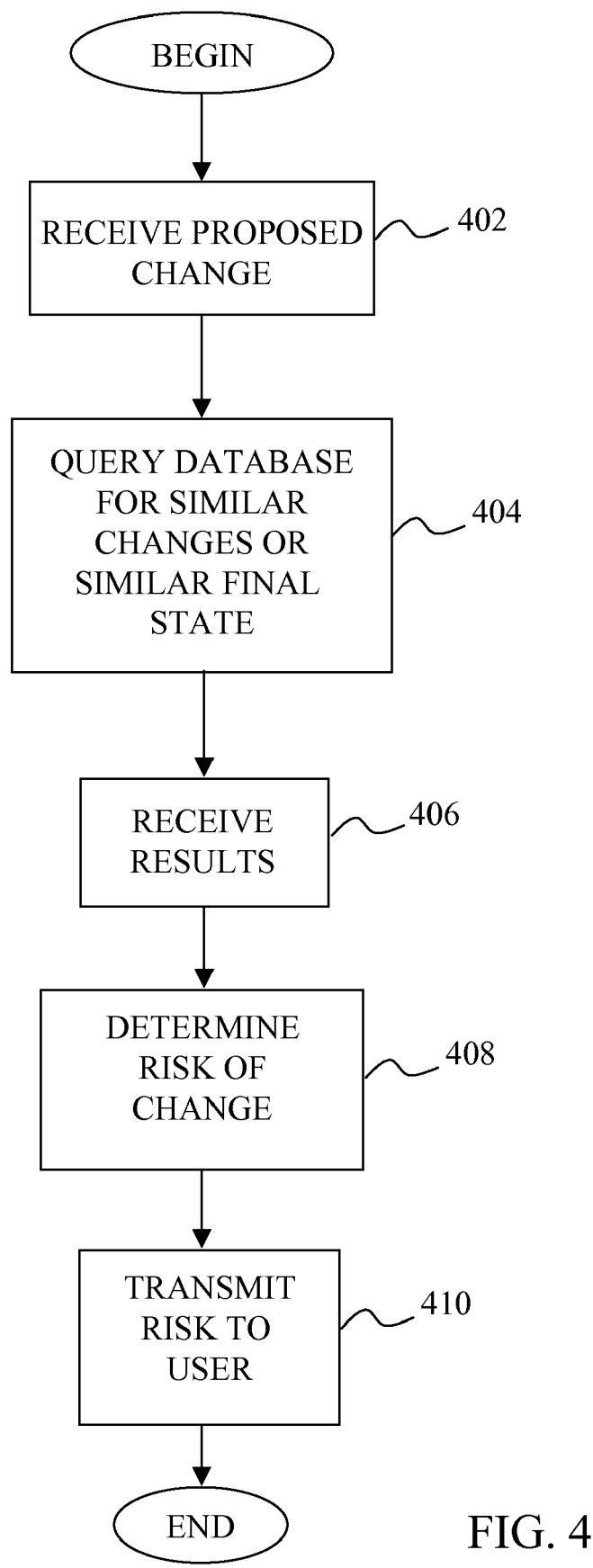
FIG. 4 shows a block diagram of a process by which a server may determine the risk associated with a proposed installation of an application by a client in one embodiment of the present invention.

FIG. 4 shows an example of a method performed at a server 104 according an embodiment of the present invention. In some embodiments process shown in FIG. 4 may be performed in the server module 109. At block 402 a proposed changes are received from a client. At block 404 the database is queried to see if similar changes have been requested or a final state similar to the one requested by the client has already been created. If no similar state exists, a new state is created. This new state may not have any performance information associated with it.

At block 406 results are received from the database. At block 408 the risk of the proposed new state or risk of change is determined. At block 410 the risk is transmitted back to the client. Of course no risk may be transmitted if the proposed state is disallowed.

Figure 5:
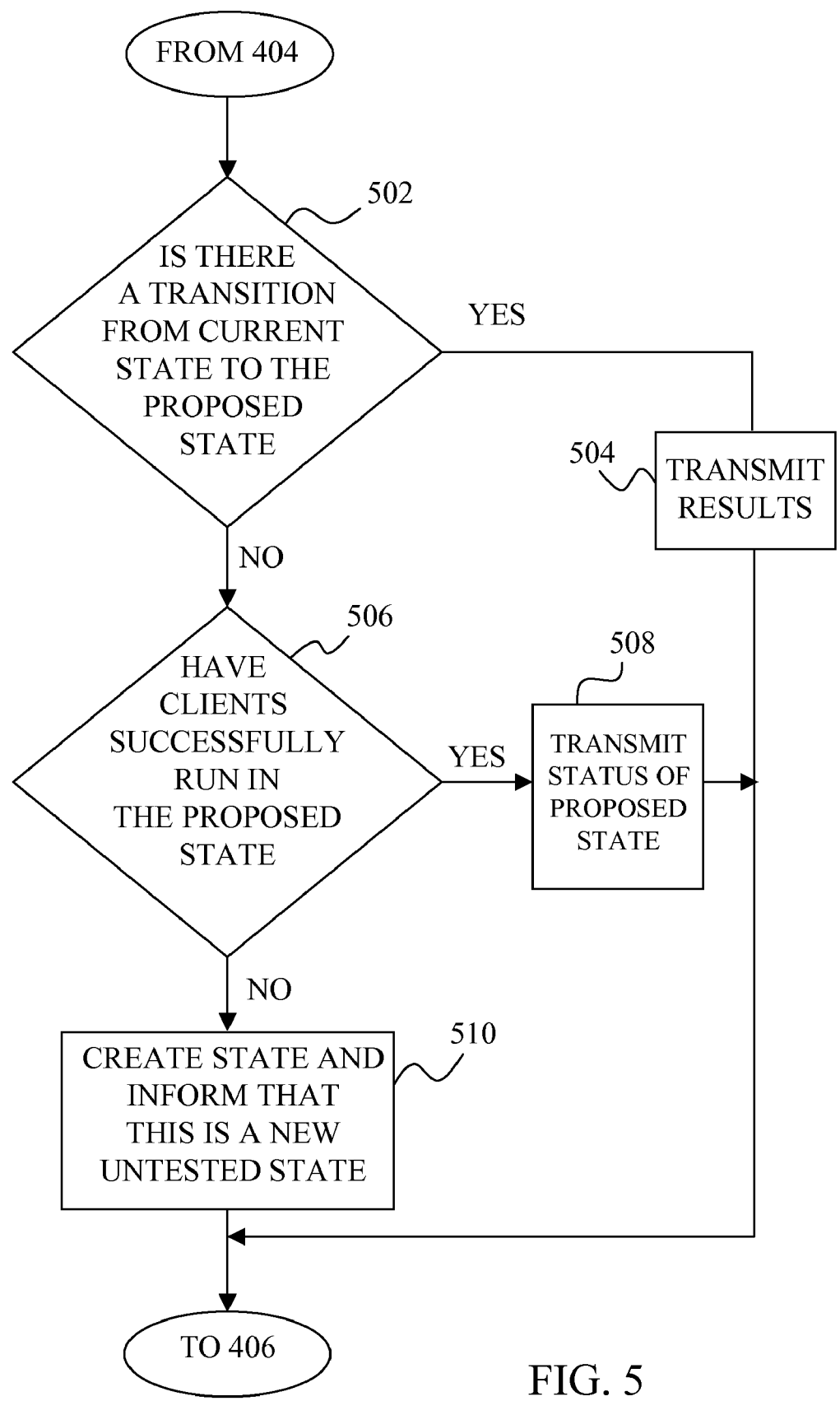
FIG. 5 shows a more detailed block diagram of a process that may be performed in one of the blocks shown in FIG. 4.

FIG. 5 shows a more detailed example of the process performed in block 404 shown in FIG. 4. The process begins at block 502 where the database is queried to determine whether there is a transition from the current state of the proposing client to the final state proposed by the client. If such a state transition exists, the results of such a change are transmitted to the server in block 504. Another embodiment might return results if a threshold number of state transitions exist. These results could include, for example, an indication that the state change caused degraded performance. If, however, such a state transition has not occurred, the database may be examined to see if a state matching the proposed state exists at block 506. Is such a state exists, the performance (also referred to as a status) is transmitted to the server 508. If such a state does not exist, the state is created and the server is informed that the state is a new state 510. Another embodiment might return results based on the existence of a threshold number of states.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for tracking performance of various configurations of co-resident applications on a plurality of clients, the system comprising:
a plurality of client systems, each client system including a client module configured to determine performance characteristics of a current state of the client, wherein the current state includes an indication of applications installed on the client;

a server coupled to the plurality of clients, the server including a server module configured to determine a risk associated with a proposed state change of a one of the plurality of client systems; and a database coupled to the server and the plurality of client systems configured to receive status updates relating to current operating conditions of the plurality of client systems and to receive state change information in the event one or more of the client systems changes from one state to another state.

2. The system of claim 1, wherein each of the plurality of client systems has a same hardware configuration.

3. The system of claim 1, wherein each of the plurality of clients are configured to provide periodic updates to the database of its performance characteristics.

4. The system of claim 3, wherein each of the plurality of clients are configured to provide an indication to the database when a change of applications installed thereon occurs.

5. The system of claim 1, wherein the server is configured to query the database to determine the risk associated with the proposed change.

6. The system of claim 5, wherein the server is configured to compare performance information of a the current state and the proposed state to determine the risk associated with the proposed change.

7. A method for determining the operating status of a proposed application configuration on a first client, the method comprising:

receiving updates from a plurality of clients, each update including a client identification, a previous state indication, a current state indication, and an indication of the operating status of the current state;

storing the updates in a database, the updates being stored such that the performance of a current state may be identified at two different times;

receiving a proposed state change from the first client, the proposed state change including a current state of the first client and a proposed application to be added to the first client;

querying the database to identify instances of the proposed state change;

determining risks associated with adding the proposed application based on the results of querying the database; and transmitting to the first client a description of the risks associated with adding the proposed application.

8. The method of claim 7, wherein receiving updates includes receiving periodic updates.

9. The method of claim 7, wherein receiving updates includes receiving an update each time one of the plurality of clients adds a new application or removes an existing application.

10. The method of claim 7, wherein querying includes identifying a state the same as the current state and a state the same as the proposed state.

11. The method of claim 10, wherein determining includes comparing the performance information of the current state and the proposed state.

12. The method of claim 11, wherein determining includes classifying the proposed state change as acceptable if the difference between the performance information of the current state and the proposed state is within predetermined tolerances.

13. The method of claim 12, wherein transmitting includes indicating to the client that the proposed change is acceptable by allowing the application to be added to the client.

14. The method of claim 7, further comprising:
transmitting the proposed application to the client.

15. The method of claim 14, further comprising:
receiving a status change update after the proposed application is transmitted to the client.

16. The method of claim 15, further comprising:
creating a new state including the proposed application.

17. A method of creating a database of possible states of a plurality of clients, each state including a unique combination of applications, the method comprising:

receiving periodic updates from the plurality of clients, each update including a performance indication and an applications list;

receiving a status change update each time one of the plurality of clients adds an application, the status change update include an updated applications list containing an indication of all applications on the one of the plurality of clients;

comparing the status change update with one or more of the previous periodic updates; and creating a new state in the database whenever updated applications list does not match any previously received applications list.

18. The method of claim 17, wherein the periodic updates further include a hardware configuration indication.

* * * * *